(12) United States Patent
Kurian et al.

(10) Patent No.: US 12,153,548 B2
(45) Date of Patent: Nov. 26, 2024

(54) MULTI-COMPUTER SYSTEM FOR CONTROLLING DATA RELATION AND REDUNDANCY

(71) Applicant: Bank of America Corporation, Charlotte, NC (US)

(72) Inventors: Manu Kurian, Dallas, TX (US); Albena N. Fairchild, Spruce Pine, NC (US); Aeric John Solow, Richardson, TX (US)

(73) Assignee: Bank of America Corporation, Charlotte, NC (US)

( * ) Notice: Subject to any disclaimer, the term of this patent is extended or adjusted under 35 U.S.C. 154(b) by 148 days.

(21) Appl. No.: 17/690,479

(22) Filed: Mar. 9, 2022

(65) Prior Publication Data
US 2023/0289325 A1 Sep. 14, 2023

(51) Int. Cl.
*G06F 16/174* (2019.01)
(52) U.S. Cl.
CPC ...... *G06F 16/1748* (2019.01); *G06F 16/1744* (2019.01)
(58) Field of Classification Search
CPC .................. G06F 16/1748; G06F 16/1744
See application file for complete search history.

(56) References Cited

U.S. PATENT DOCUMENTS

| | | | |
|---|---|---|---|
| 9,479,616 B2 | 10/2016 | Koifman et al. | |
| 10,019,458 B2 | 7/2018 | Fallon | |
| 10,033,405 B2 | 7/2018 | Fallon | |
| 10,567,458 B2 | 2/2020 | Bhaskar et al. | |
| 2007/0033340 A1* | 2/2007 | Tulskie | G06F 3/0605 |
| | | | 711/108 |
| 2009/0228599 A1* | 9/2009 | Anglin | G06F 11/1453 |
| | | | 709/231 |
| 2012/0084523 A1* | 4/2012 | Littlefield | G06F 3/065 |
| | | | 711/E12.103 |
| 2018/0232528 A1* | 8/2018 | Williamson | G06N 5/025 |
| 2022/0244869 A1* | 8/2022 | Kanteti | G06F 3/0631 |

* cited by examiner

*Primary Examiner* — Etienne P Leroux
*Assistant Examiner* — Farhad Agharahimi
(74) *Attorney, Agent, or Firm* — Banner & Witcoff, Ltd.

(57) ABSTRACT

Arrangements for controlling data relations and data redundancies are presented. In some aspects, data may be received from a plurality of sources. The data may then be analyzed to determine a score or value associated with the data. Machine learning may be used to analyze the data and/or determine the score associated with the data. In some examples, a type of data may be identified. Based on the type of data, and the data, one or more connections to other data or types of data may be identified. In some examples, the data, as well as any identified connections, any determined score, and the like may be stored in a data container associated with the identified type of data. Stored data may be analyzed to determine whether one or more redundancies exist. If one or more redundancies are identified, one or more data redundancy actions may be identified and executed.

21 Claims, 9 Drawing Sheets

MULTI-COMPUTER SYSTEM FOR CONTROLLING DATA RELATION AND REDUNDANCY

BACKGROUND

Aspects of the disclosure relate to electrical computers, systems, and devices for controlling data relations and redundancy.

Enterprise organizations often store vast amounts of data. As data continues to grow over time, it may be difficult to understand the value of data or different types of data. In addition, it may be difficult to evaluate whether data should be maintained. Accordingly, conventional systems may be inefficient and continuously store data that is redundant. In addition to inefficiencies, these arrangements may require additional resources to store the data that is continuously being received. Accordingly, aspects described herein are directed to arrangements for efficiently controlling data relations and identifying data redundancies.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical issues associated with controlling data relations and data redundancies.

In some aspects, data may be received from a plurality of sources. The data may then be analyzed to determine a score or value associated with the data. Machine learning may be used to analyze the data and/or determine the score or value associated with the data.

In some examples, a type of data may be identified. Based on the type of data, and the data, one or more connections or relations to other data or types of data may be identified. In some examples, the data, as well as any identified connections or relations, any determined score, and the like may be stored in a data container associated with the identified type of data.

In some arrangements, stored data may be analyzed to determine whether one or more redundancies exist. One or more redundancies may include data that is outdated or has been superseded by later saved data, data that is duplicative, or the like. If one or more redundancies are identified, one or more data redundancy actions may be identified. The data redundancy actions may be identified based on one or more rules in a data redundancy engine. The data redundancy actions may include compressing data, combining data, deleting data, and the like.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, data storage is a critical function for many enterprise organizations. Accordingly, it may be advantageous to understand a value of data and identify data redundancy actions to efficiently store data and provide storage resources for incoming or later received data.

For instance, as discussed more fully herein, data may be received from a plurality of sources. The data may be evaluated to determine a score or value of the data. The score or value may be based on data use, potential value to others, and the like. In some examples, machine learning may be used to score the data.

In some arrangements, a type of data may be identified. The type of data may be used to identify one or more connections or relations to other data or other data types. In some examples, machine learning may be used to identify the data type, data connections or relations, and the like. Data may then be stored in data containers associated with the identified data type. A data score, as well as any data connections or relations, may also be scored.

A data redundancy engine may be used to evaluate stored data to determine whether one or more data redundancies exist. If so, one or more data redundancy actions may be identified. For instance, one or more data compression actions, data deletion actions, or the like, may be identified and executed.

These and various other arrangements will be discussed more fully below.

Figure 1A:
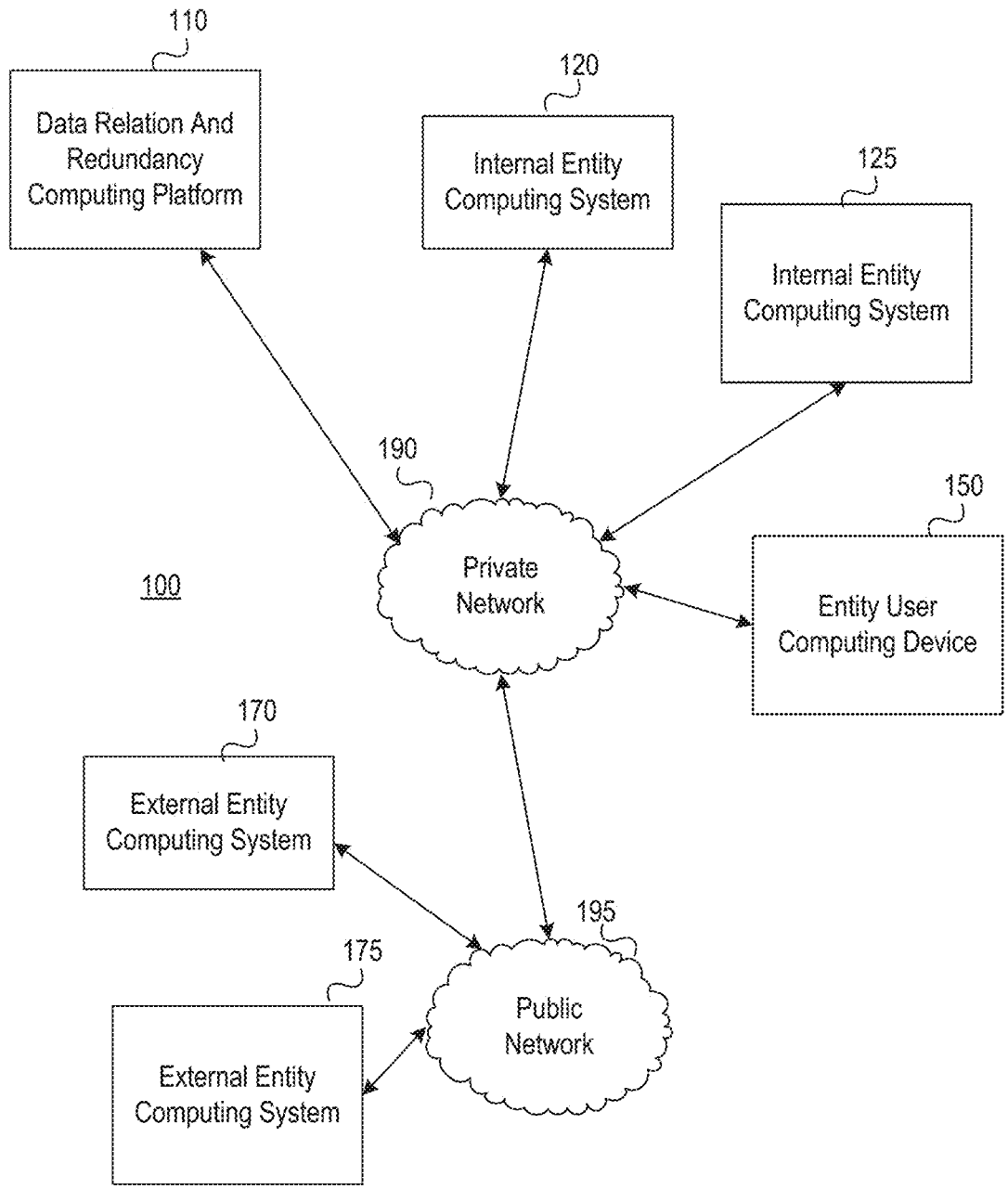
FIGS. 1A and 1B depict an illustrative computing environment for implementing data relation and redundancy functions in accordance with one or more aspects described herein.
Figure 1B:
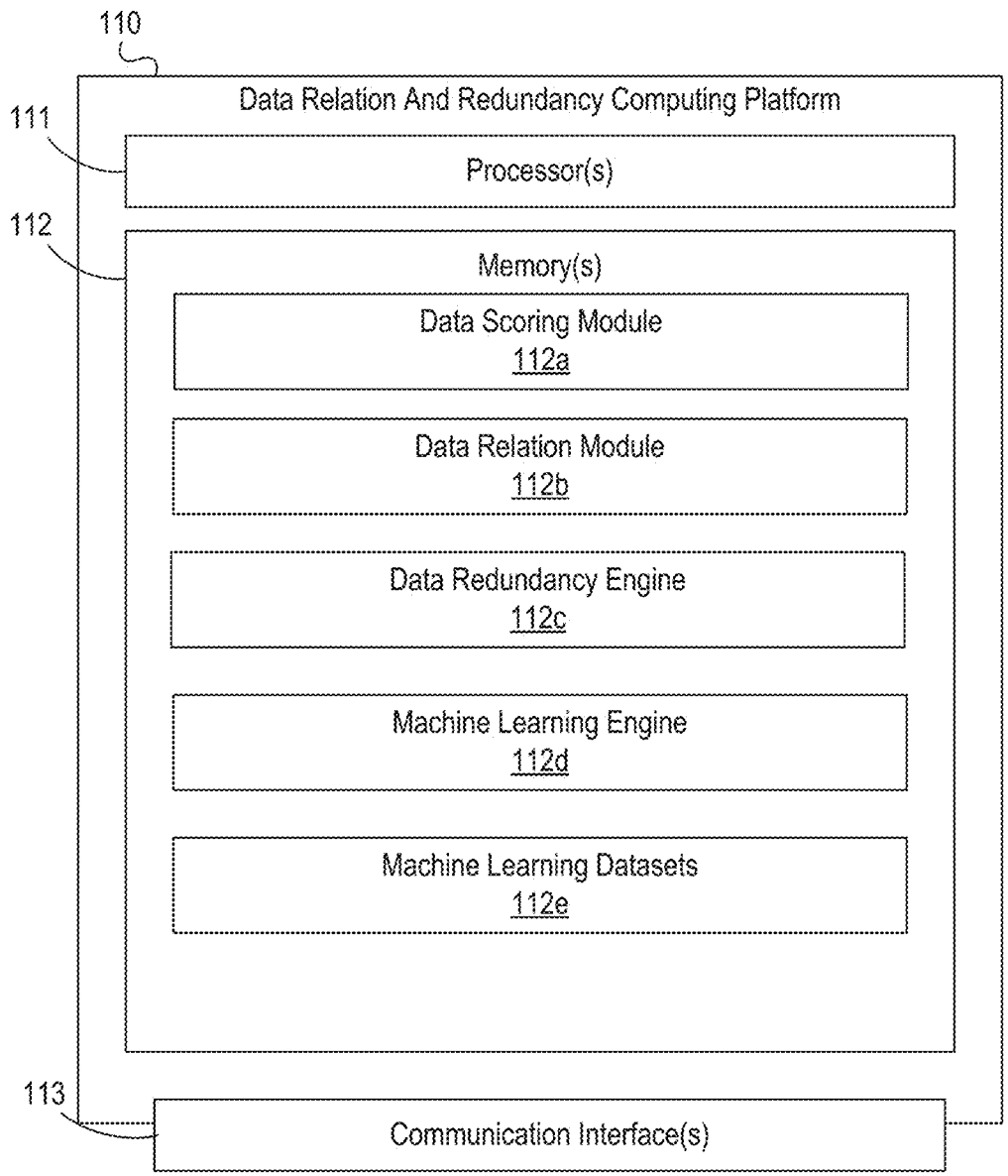

FIGS. 1A-1B depict an illustrative computing environment for implementing and using data relation and redundancy functions in accordance with one or more aspects described herein. Referring to FIG. 1A, computing environment 100 may include one or more computing devices and/or other computing systems. For example, computing environment 100 may include data relation and redundancy computing platform 110, internal entity computing system 120, internal entity computing system 125, entity user computing device 150, external entity computing system 170 and external entity computing system 175. Although two internal entity computing systems 12,125, one entity user computing device 150, and two external entity computing systems 170, 175 are shown, any number of systems or devices may be used without departing from the invention.

Data relation and redundancy computing platform 110 may be configured to perform intelligent, dynamic and efficient data relation and redundancy functions, as described more fully herein. For instance, data relation and redundancy computing platform 110 may receive data from a plurality of sources. For instance, data relation and redundancy computing platform 110 may receive data from internal sources (e.g., sources internal to the enterprise organization implementing the data relation and redundancy computing platform 110), such as internal entity computing system 120, internal entity computing system 125, or the like, and/or external sources (e.g., sources external to the enterprise organization implementing the data relation and redundancy computing platform 110), such as external entity computing system 170, external entity computing system 175, or the like.

The received data may be analyzed to evaluate a value of the data. For instance, a machine learning model trained on historical data related to data value and relations may be used to evaluate the received data to understand value and score the data. In some examples, the data score may be based on uses of the data at one or more entity devices, number of times data is retrieved for further use, potential value to other users, or the like.

The received data may be further analyzed, e.g., using machine learning, to identify a type of data and relations between the data and other types or pieces of data. For instance, the machine learning model may analyze the data to determine a type of data and relations between this data and other related types of data. In one example, the data may be analyzed and identified as mortgage payment data. In addition, one or more connections between mortgage payment data may be identified and associated with the data. Accordingly, relations such as payment data, amount of payment, payee, payor, and the like, may be identified. The data may then be stored in association with the identified type of data, as well as the identified relations or connections between this data and other types of data. This may enable more efficient searching of data (e.g., based on identified relations between data). Additionally or alternatively, the data may be stored according to a determined score or value, such that data having a same or similar value or score may be stored in a data container to enable simplified access to the data. For instance, data may be tagged with a value or score and stored according to the tag.

Further, data relation and redundancy computing platform 110 may execute one or more data redundancy evaluations. In some examples, a data redundancy engine of the data relation and redundancy computing platform 110 may evaluate data to determine whether it is redundant, duplicative, or the like. For instance, the data redundancy engine may determine whether the data is redundant (e.g., includes data that has been superseded by other data) and/or is duplicative (whether the same data is stored in another location or more than once in the same location). In some examples, the determined data score may be used to identify one or more redundancies. For instance, data having a score below a predetermined threshold may be considered irrelevant or no longer necessary for storage.

If so, one or more data redundancy actions may be executed. For instance, one or more data control rules may be implemented to determine whether data identified as redundant or duplicative may be deleted (e.g., based on one or more business practices, regulatory rules, or the like). If so, identified data may be deleted. Additionally or alternatively, one or more data control rules may be implemented to determine whether the data may be compressed. If so, the identified data may be compressed and stored in a compressed state, thereby freeing up storage space for additional data received by the data relation and redundancy computing platform 110. In still another example, data having a score below a threshold may be deleted, moved to an alternate storage location, or the like. Accordingly, by executing one or more data redundancy actions, the system may proactively free data storage capacity in anticipation of additional data that may be received.

Computing environment 100 may further include internal entity computing system 120 and/or internal entity computing system 125. Internal entity computing system 120 and/or internal entity computing system 125 may be systems internal to or associated with the enterprise organization implementing the data relation and redundancy computing platform 110 and may include one or more computing devices configured to execute or host one or more applications associated with the enterprise organization. For instance, internal entity computing system 120 and/or internal entity computing system 125 may execute or host one or more applications providing services to customers, such as payment systems, mobile or online banking systems, or the like.

Entity user computing device 150 may include one or more computing devices (e.g., servers, desktop computing devices, or the like) that may be associated with the enterprise organization and may be used to configure or control one or more aspects of data relation and redundancy computing platform 110. For instance, entity user computing device 150 may be used to control or configure rules associated with data compression, data deletion, and the like.

External entity computing system 170 and/or external entity computing system 175, and the like may be one or more computing systems associated with an entity other than the enterprise organization. In some examples, the external entity computing system 170 and/or external entity computing system 175 may receive and/or store data from one or more external sources. For instance, external entity computing system 170 may be a payment processing system and may store data associated with processed payments. In some examples, and with appropriate permissions, data may be transmitted from the external entity computing system 170 and/or external entity computing system 175 to the data relation and redundancy computing platform 110 for evaluation and/or storage.

As mentioned above, computing environment 100 also may include one or more networks, which may interconnect one or more of data relation and redundancy computing platform 110, internal entity computing system 120, internal entity computing system 125, entity user computing device 150, external entity computing system 170 and/or external entity computing system 175. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, data relation and redundancy computing platform 110, internal entity computing system 120, internal entity computing system 125, entity user computing device 150, may be associated with an enterprise organization (e.g., a financial institution), and private network 190 may be associated with and/or operated by the organization, and may include one or more networks (e.g., LANs, WANs, virtual private networks (VPNs), or the like) that interconnect data relation and redundancy computing platform 110, internal entity computing system 120, internal entity computing system 125, entity user computing device 150, and one or more other computing devices and/or computer systems that are used by, operated by, and/or otherwise associated with the organization. Public network 195 may connect private network 190 and/or one or more computing devices connected thereto (e.g., data relation and redundancy computing platform 110, internal entity computing system 120, internal entity computing system 125, entity user computing device 150) with one or more networks and/or computing devices that are not associated with the organization. For example, external entity computing system 170 and/or external entity computing system 175, might not be associated with an organization that operates private network 190 (e.g., because external entity computing system 170 and/or external entity computing system 175 may be owned, operated, and/or serviced by one or more entities different from the organization that operates private network 190, one or more customers of the organization, one or more employees of the organization, public or government entities, and/or vendors of the organization, rather than being owned and/or operated by the organization itself), and public network 195 may include one or more networks (e.g., the internet) that connect external entity computing system 170 and/or external entity computing system 175 to private network 190 and/or one or more computing devices connected thereto (e.g., data relation and redundancy computing platform 110, internal entity computing system 120, internal entity computing system 125, entity user computing device 150).

Referring to FIG. 1B, data relation and redundancy computing platform 110 may include one or more processors 111, memory 112, and communication interface 113. A data bus may interconnect processor(s) 111, memory 112, and communication interface 113. Communication interface 113 may be a network interface configured to support communication between data relation and redundancy computing platform 110 and one or more networks (e.g., private network 190, public network 195, or the like). Memory 112 may include one or more program modules having instructions that when executed by processor(s) 111 cause data relation and redundancy computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of data relation and redundancy computing platform 110 and/or by different computing devices that may form and/or otherwise make up data relation and redundancy computing platform 110.

For example, memory 112 may have, store and/or include data scoring module 112a. Data scoring module 112a may store instructions and/or data that may cause or enable the data relation and redundancy computing platform 110 to receive data from a plurality of sources (e.g., internal sources, external sources, and the like) and score or determine a value associated with the data. In some examples, data usage may be monitored to score data (e.g., more frequently used data may have a higher score or may be considered more valuable than lesser used data). In some examples, machine learning may be used to score the data.

For instance, data relation and redundancy computing platform 110 may have, store and/or include a machine learning engine 112d storing one or more machine learning datasets 112e. Machine learning engine 112d may train, execute, update and/or validate a machine learning model. For instance, previously received data may be used to train the machine learning model (e.g., via supervised learning, unsupervised learning, or the like). For instance, the machine learning model may be trained using labelled data which may, e.g., include historical data corresponding to various values or scores (e.g., data scored between 1 and 10, 1 and 100, or the like), historical data corresponding to different connections or relations between different data types, and the like (e.g., data of a first type may be historically connected to data of a second type, third type, or the like).

In some examples, one or more rules or outputs may be used to train the machine learning model. For instance, one or more rules indicating additional factors, parameters, or the like, to be used in evaluation of the data for scoring, classification, and the like, may be used to train, update and/or validate the machine learning model.

Various machine learning algorithms may be used (e.g., by the machine learning engine 112d and/or the one or more machine learning models) without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. Additional or alternative machine learning algorithms may be used without departing from the invention.

Data relation and redundancy computing platform 110 may further have, store and/or include data relation module 112b. Data relation module 112b may store instructions and/or data that may cause or enable data relation and redundancy computing platform 110 to identify one or more connections or relations associated with a type of data. For instance, as data is received, it may be analyzed to determine a type of data. Based on the type of data, one or more relations or connections to other types of data may be identified. In some examples, machine learning may be used to identify the relations and/or connections. For instance, a data type, data content, and the like, may be input into the machine learning model and one or more relations or connections may be output or generated by the machine learning model. The data may then be stored in a data store or data container associated with the type of data identified. The data may be stored and the identified relations or connections may also be stored and associated with the data and/or data type.

Data relation and redundancy computing platform 110 may further have, store and/or include data redundancy engine 112c. Data redundancy engine 112c may store instructions and/or data that may cause or enable the data relation and redundancy computing platform 110 to evaluate the data to determine whether one or more redundancies exist. For instance, data may be evaluated to determine whether it is duplicative of other data stored by the system, whether it is redundant based on other stored data, whether a score is within a predetermined threshold for action, and the like. If the data is identified as redundant, one or more rules may be executed to determine whether the data should be compressed, deleted, moved to an alternate storage location, or the like. This may aid in freeing additional storage capacity to receive and store subsequent data.

FIGS. 2A-2E depict one example illustrative event sequence for using data relation and redundancy functions in accordance with one or more aspects described herein. The events shown in the illustrative event sequence are merely one example sequence and additional events may be added, or events may be omitted, without departing from the invention. Further, one or more processes discussed with respect to FIGS. 2A-2E may be performed in real-time or near real-time.

Figure 2A:
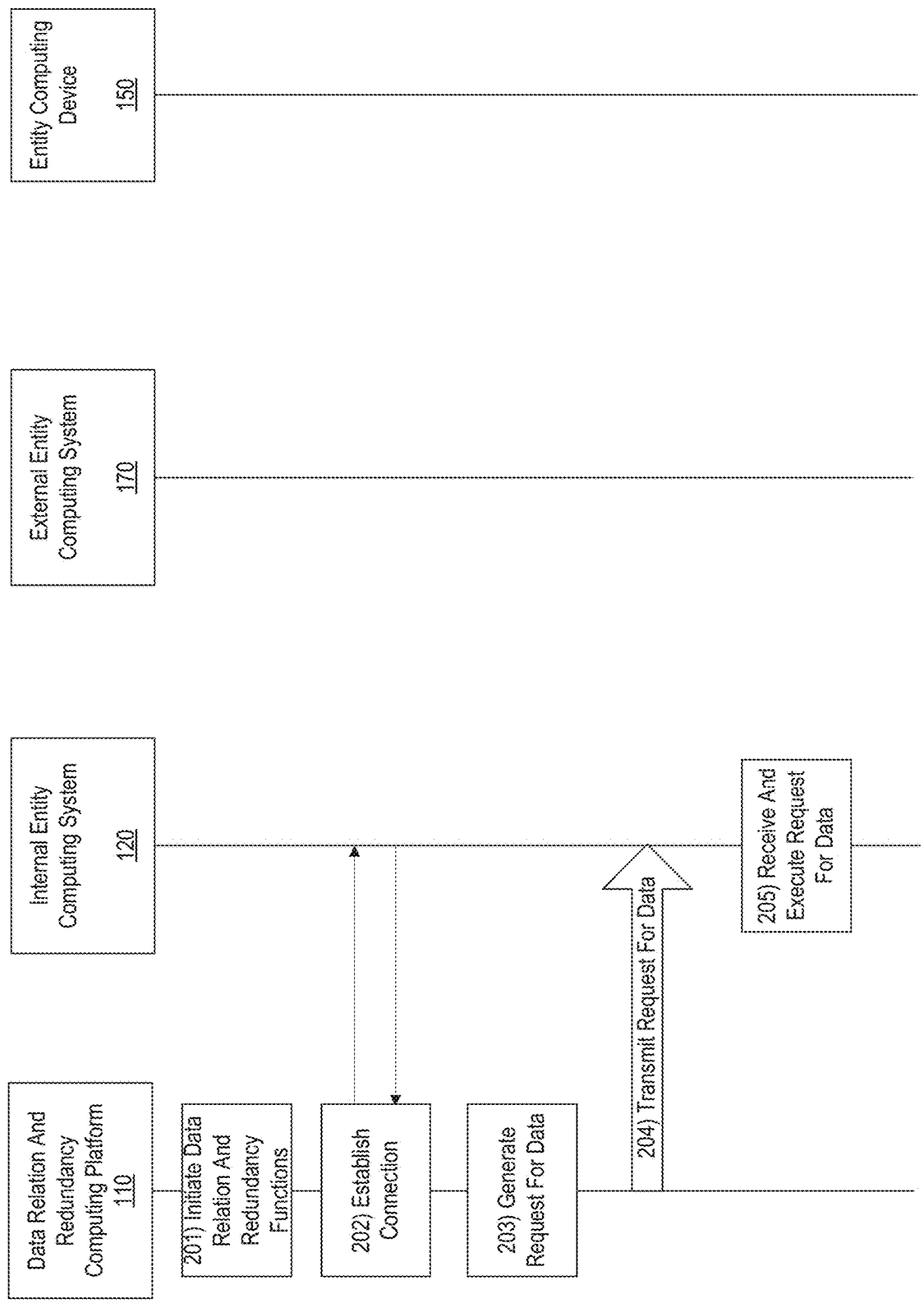
FIGS. 2A-2E depict an illustrative event sequence for implementing data relation and redundancy functions in accordance with one or more aspects described herein.

With reference to FIG. 2A, at step 201, data relation and redundancy computing platform 110 may initiate or activate one or more data relation and redundancy functions. For instance, data relation and redundancy computing platform 110 may initiate or activate one or more functions for receiving data from various sources (e.g., internal entity computing system 120, external entity computing system 170, or the like), executing a machine learning model, scoring or valuing data, identifying data types and connections, and the like. In some examples, the functions may be initiated in response to an attempt to transmit data from a device to the data relation and redundancy computing platform 110, to a request to transmit data, to an instruction to request data from one or more sources, and the like.

At step 202, data relation and redundancy computing platform 110 may establish a connection with internal entity computing system 120. For instance, a first wireless connection may be established between the data relation and redundancy computing platform 110 and internal entity computing system 120. Upon establishing the first wireless connection, a communication session may be initiated between data relation and redundancy computing platform 110 and internal entity computing system 120.

At step 203, a request for data may be generated by the data relation and redundancy computing platform 110. For instance, a request to receive data from internal entity computing system 120 may be generated. The request may include a request to receive data in a data stream (e.g., continuously receive data or receive streaming data as it is received by the internal entity computing system 120) or receive batch transfers of data at predetermined times, days, or the like.

At step 204, the request for data may be transmitted by the data relation and redundancy computing platform 110 to the internal entity computing system 120. For instance, data relation and redundancy computing platform 110 may transmit the request for data to the internal entity computing system 120 during the communication session initiated upon establishing the first wireless connection.

At step 205, internal entity computing system 120 may receive the request for data and execute the request. For instance, data at the internal entity computing system 120 may be retrieved and instructions to transmit data subsequently received by the internal entity computing system 120 may be executed.

Figure 2B:
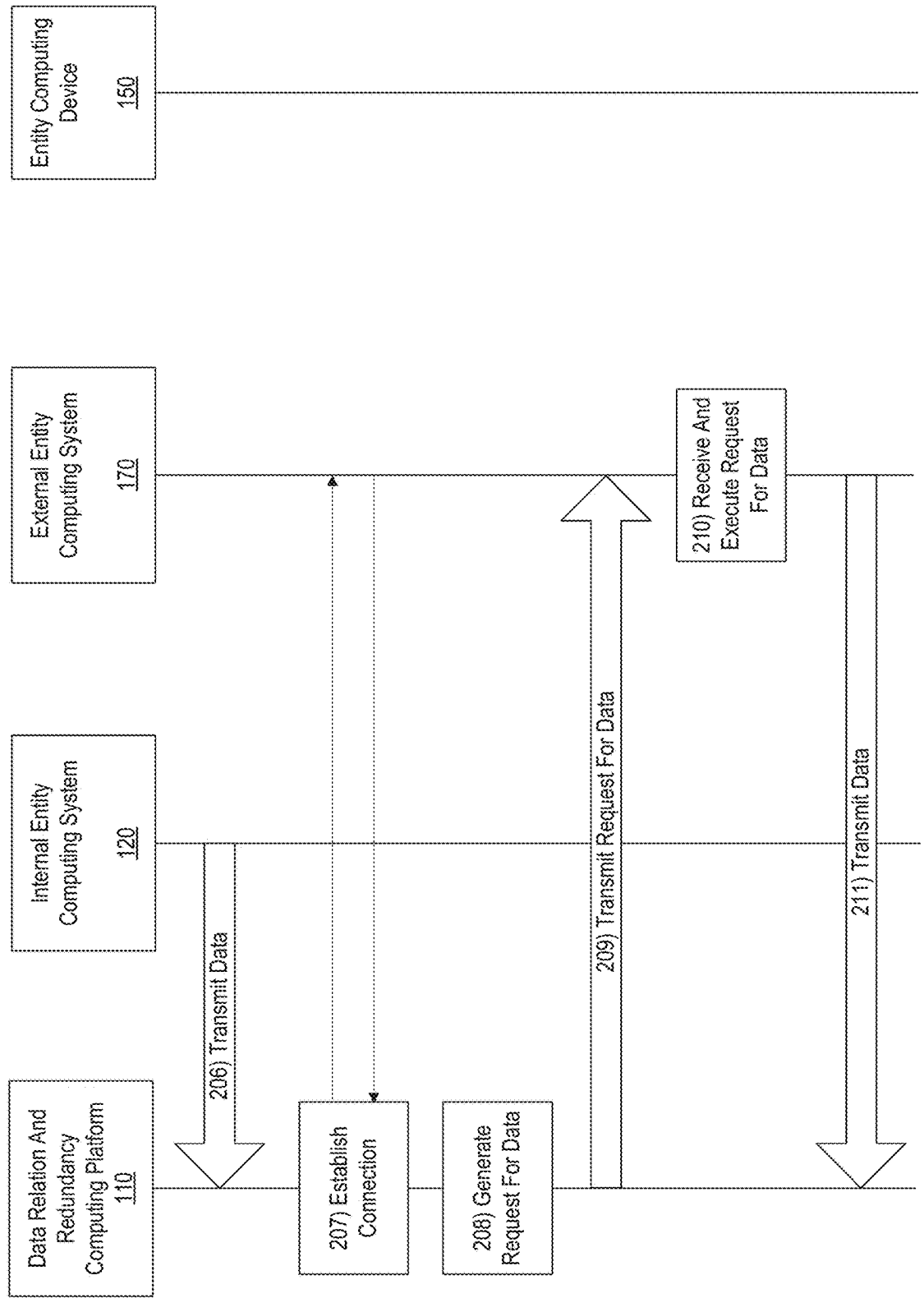

With reference to FIG. 2B, at step 206, internal entity computing system 120 may transmit the requested data to the data relation and redundancy computing platform 110. For instance, internal entity computing system 120 may transmit the requested data during the communication session initiated upon establishing the first wireless connection.

At step 207, data relation and redundancy computing platform 110 may establish a connection with external entity computing system 170. For instance, a second wireless connection may be established between the data relation and redundancy computing platform 110 and external entity computing system 170. Upon establishing the second wireless connection, a communication session may be initiated between data relation and redundancy computing platform 110 and external entity computing system 170.

At step 208, a request for data may be generated by the data relation and redundancy computing platform 110. For instance, a request to receive data from external entity computing system 170 may be generated. The request may include a request to receive data in a data stream (e.g., continuously receive data or receive streaming data as it is received by the internal entity computing system 120) or receive batch transfers of data at predetermined times, days, or the like.

At step 209, the request for data may be transmitted by the data relation and redundancy computing platform 110 to the external entity computing system 170. For instance, data relation and redundancy computing platform 110 may transmit the request for data to the external entity computing system 170 during the communication session initiated upon establishing the second wireless connection.

At step 210, external entity computing system 170 may receive the request for data and execute the request. For instance, data at the external entity computing system 170 may be retrieved and instructions to transmit data subsequently received by the external entity computing system 170 may be executed.

At step 211, external entity computing system 170 may transmit the requested data to the data relation and redundancy computing platform 110. For instance, external entity computing system 170 may transmit the requested data during the communication session initiated upon establishing the second wireless connection.

Figure 2C:
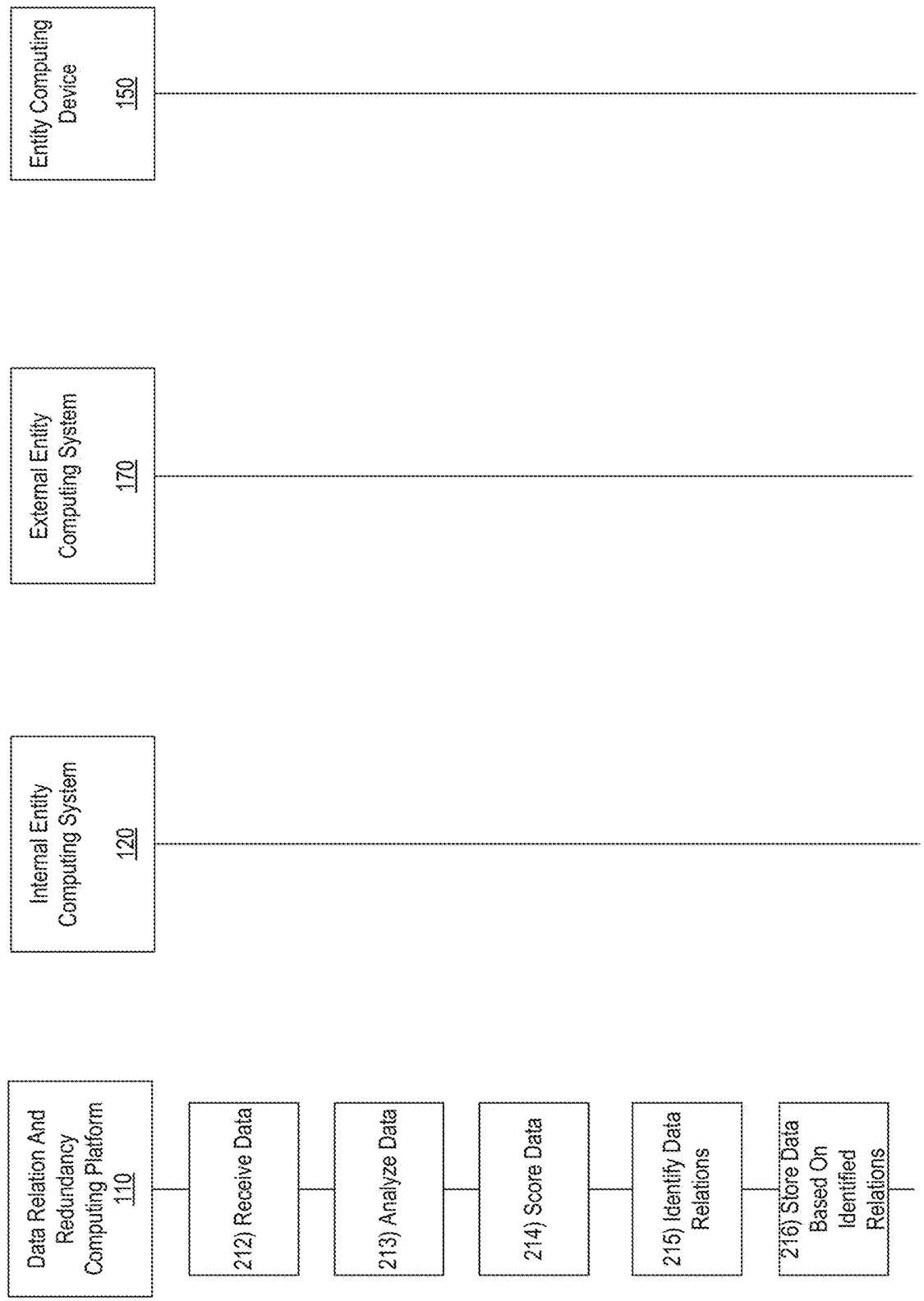

With reference to FIG. 2C, at step 212, the data relation and redundancy computing platform 110 may receive data from the internal entity computing system 120 and/or the external entity computing system 170. Although the arrangements shown depict receiving data from one internal entity computing system 120 and one external entity computing system 170, data may be received from multiple systems in parallel without departing from the invention.

In some examples, the data may include data related to customer activity. For instance, payment data associated with one or more payments made by users (e.g., loan payments, mortgage payments, bill payments, and the like). Further, various other types of customer data may be received (e.g., with permission of the user) without departing from the invention.

At step 213, the received data may be analyzed. For instance, machine learning may be used to analyze the data, score or value the data, identify a type of data, determine connections, and the like. As discussed herein, a machine learning model trained on historical data may be executed to analyzing the received data.

At step 214, the received data may, in some examples, be scored or a value of the data determined. For instance, the received data may be input into the machine learning model and a score of the data may be identified or determined. In some examples, the score may be based on data usage, criticality of the data, frequency of data being received, and the like. The machine learning model may, as discussed herein, be trained on historical data related to one or more of these factors and, accordingly, may evaluate the received data and generate or identify an appropriate score or value for the data.

At step 215, a data type may be determined and one or more relations or connections may be identified. For instance, the machine learning model may further evaluate the data to determine a type of data (e.g., address data, payment data, user identifying data, or the like) and may identify one or more relations or connections (e.g. based on data type). For instance, the machine learning model may be trained using historical data having connections labelled between different types of data. This model may be executed to identify one or more relations or connections to the received data.

At step 216, the received data, as well the identified score, data type and identified one or more relations or connections may be stored. In some examples, the data may be stored in a data store or container associated with the data type, data score, or the like. Accordingly, a user may easily and efficiently search for data by type, evaluate the value of the data based on score and identify related types of data (e.g., based on stored connections or relations).

In some arrangements, access to the data may be controlled based on a value or score of the data. For instance, higher value data (e.g., data having a higher score than other data, data having a score above a threshold, or the like) may have a first level of access that may be more limited than data having a lower score or score below a threshold that has a second, less restrictive level of access.

Figure 2D:
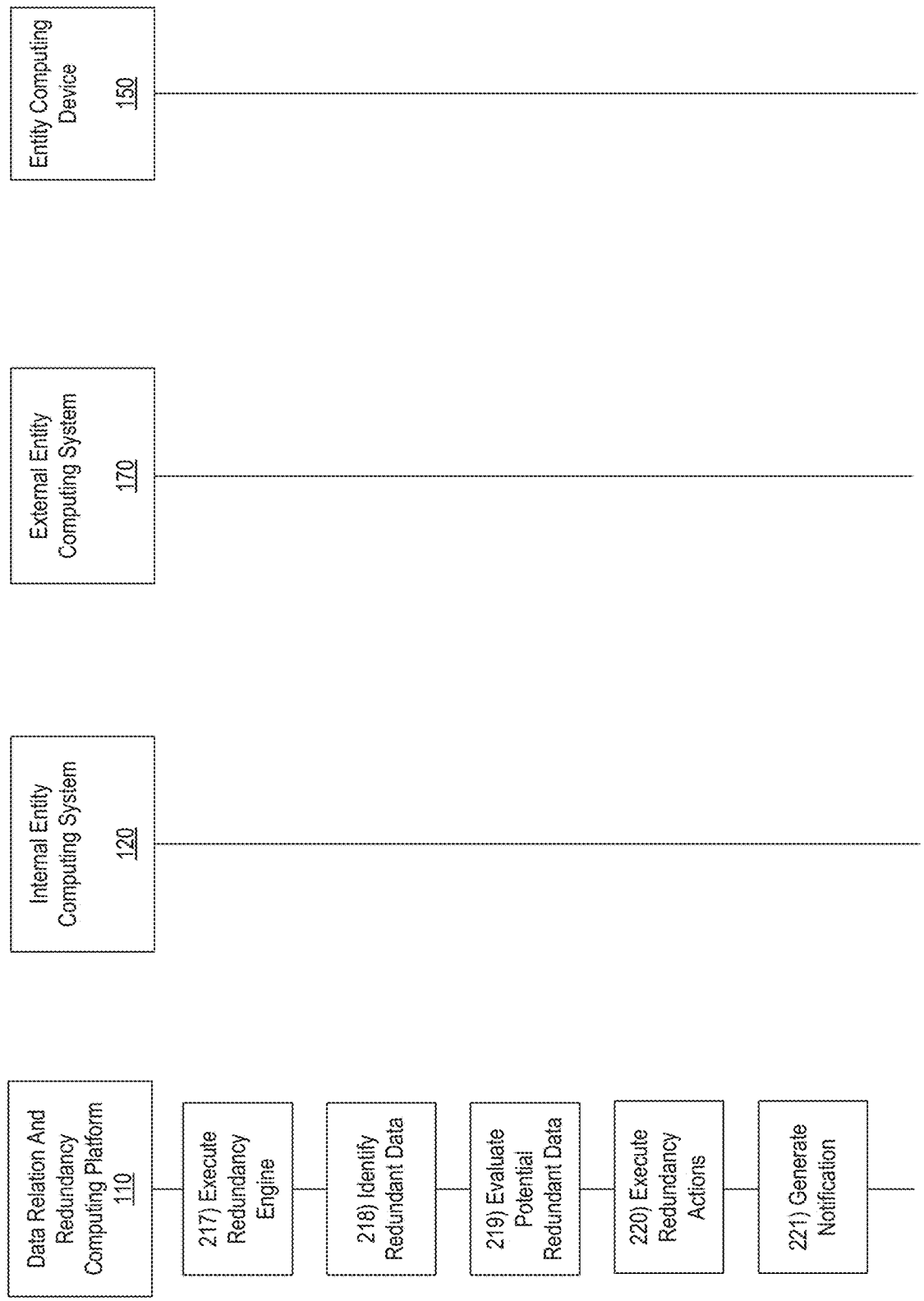

With reference to FIG. 2D, at step 217, a data redundancy engine may be executed. For instance, stored data may be evaluated to determine whether it is redundant, duplicative or the like. In some examples, evaluating the data for one or more redundancies may include evaluating a determine score associated with the data and comparing it to one or more predetermined thresholds for action. For instance, data at or below a first threshold may be considered irrelevant and eligible for one or more data redundancy actions. In some examples, the data redundancy engine may be executed at predetermined times, after a predetermined time has elapsed, upon a data threshold (e.g., capacity limit) being reached, or the like.

At step 218, based on the outcome of the analysis performed by the data redundancy engine, a determination may be made as to whether data is redundant, duplicative, or the like.

At step 219, the identified redundant or duplicative data may be further analyzed using one or more redundancy action rules. For instance, the enterprise organization may store one or more redundancy action rules that may dictate what types of data are eligible for different redundancy actions. In some examples, the redundancy action rules may be based on regulatory requirements, service level agreements, or the like. In some examples, redundancy actions may include compressing data, deleting data, or the like.

At step 220, one or more redundancy actions identified based on the redundancy action rules may be executed. For instance, an instruction or command causing the data relation and redundancy computing platform 110 to compress identified data, delete identified data, or the like, may be generated and/or executed. In some examples, after executing the one or more data redundancy actions, a connection between an outcome of the data redundancy action and other data or data types may be identified and stored. For instance, if data is compressed based on an executed data redundancy action, a connection or relation between the compressed data and one or more other types of data or data may be identified and stored.

In some examples, after execution of the one or more data redundancy actions, an output or outcome of the action may be used to further refine or train the machine learning model. For instance, information associated with execution of the one or more data redundancy actions (e.g., whether data was compressed, deleted, or the like) may be used to validate and refine the machine learning model. Accordingly, the machine learning model may be continuously updated and refined to improve accuracy.

At step 221, a notification may be generated. In some examples, the notification may include an indication of data identified as redundant, a type of redundancy action and/or that the redundancy action was executed.

Figure 2E:
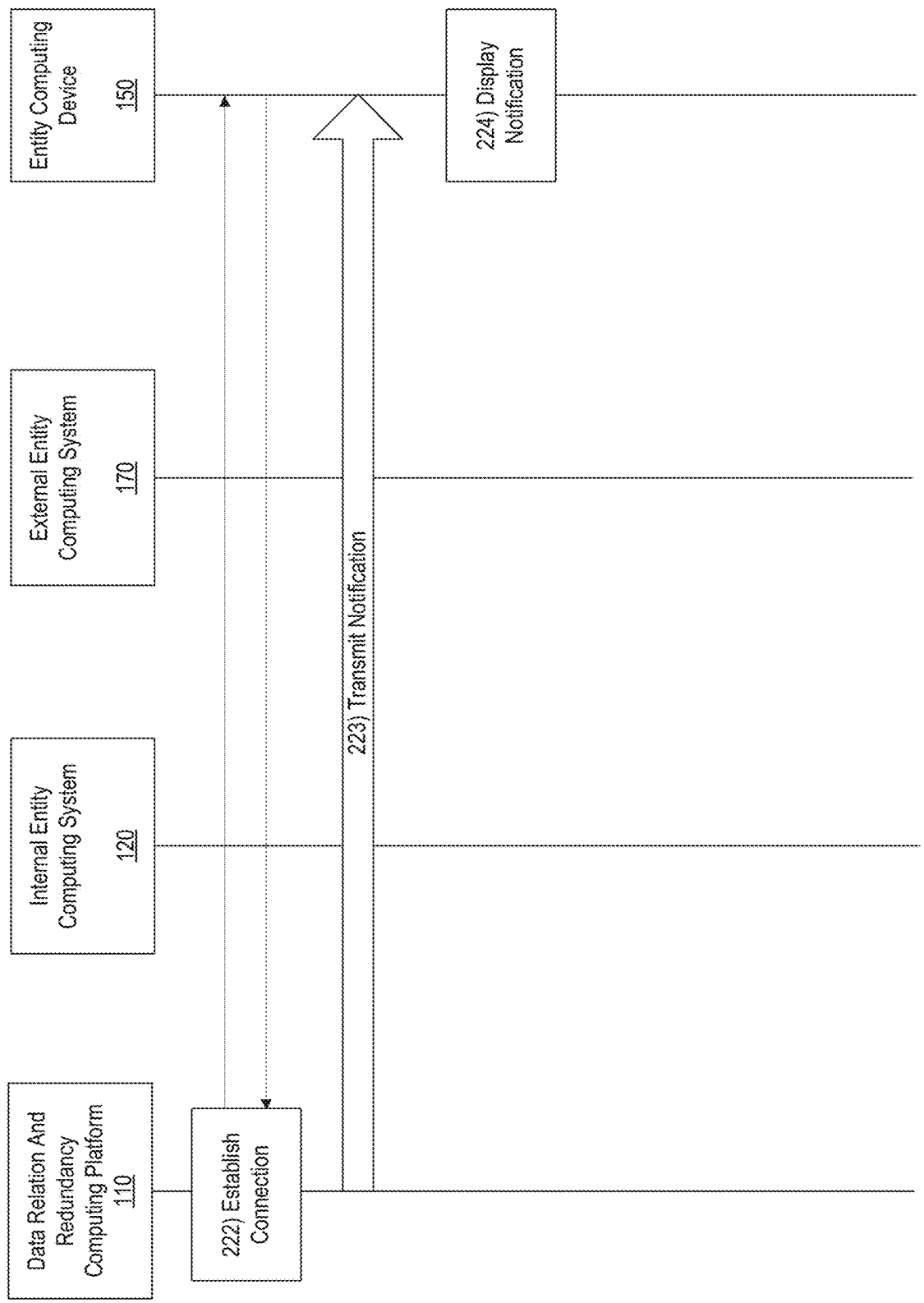

With reference to FIG. 2E, at step 222, a connection may be established between data relation and redundancy computing platform 110 and entity computing device 150. For instance, a third wireless data connection may be established between the data relation and redundancy computing platform 110 and the entity computing device 150. Upon establishing the third wireless connection, a communication session may be initiated between the data relation and redundancy computing platform 110 and the entity computing device 150.

At step 223, the generated notification may be transmitted by the data relation and redundancy computing platform 110 to the entity computing device 150. For instance, the generated notification may be transmitted during the communication session initiated upon establishing the third wireless connection. In some examples, transmitting the notification may include transmitting an instruction or command causing the notification to be displayed by the entity computing device 150.

At step 224, the notification may be received by entity computing device 150 and displayed by a display of entity computing device 150.

Figure 3:
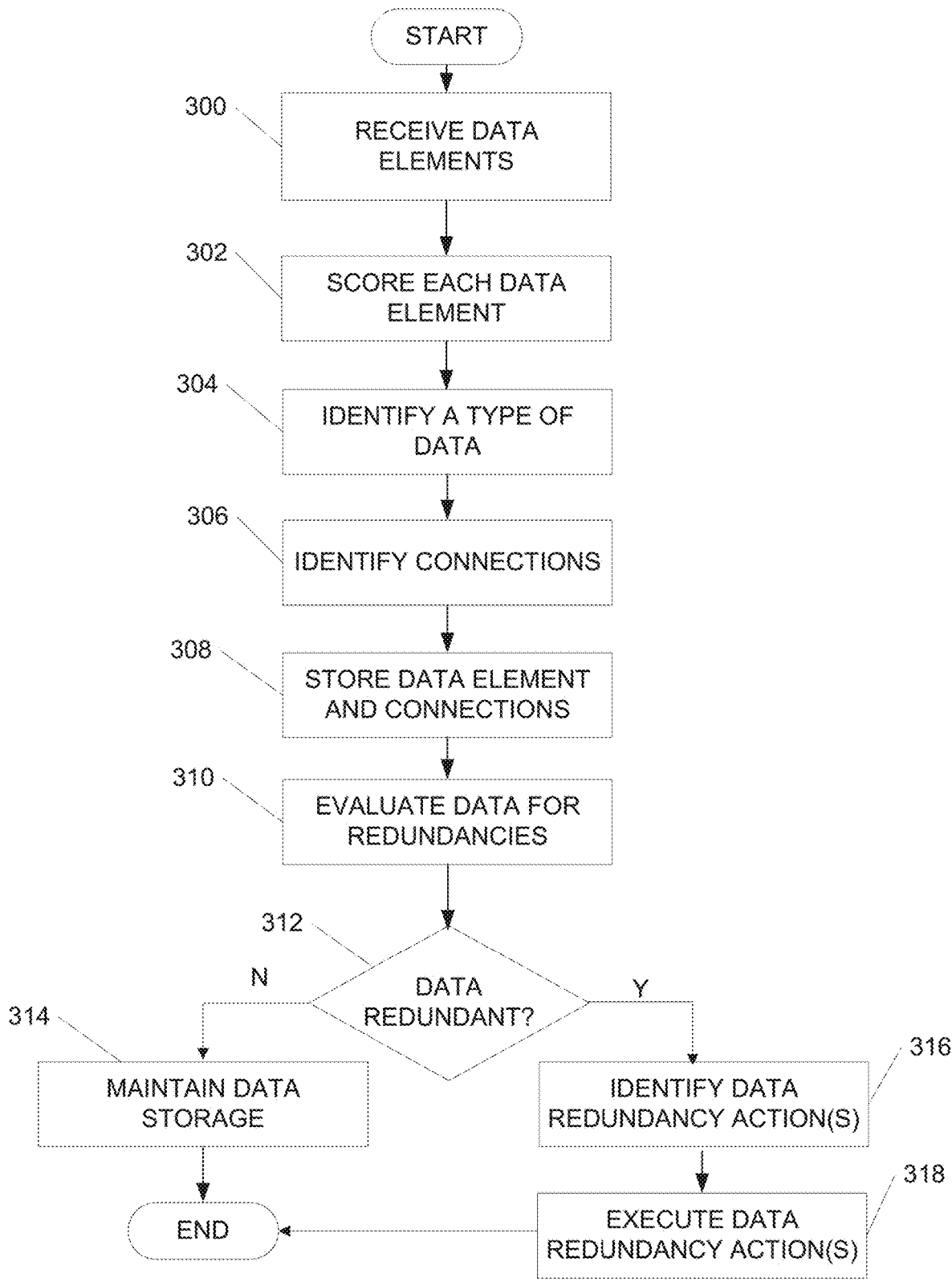
FIG. 3 illustrates an illustrative method for implementing data relation and redundancy functions according to one or more aspects described herein.

FIG. 3 is a flow chart illustrating one example method of implementing data relation and redundancy functions in accordance with one or more aspects described herein. The processes illustrated in FIG. 3 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 3 may be performed in real-time or near real-time.

At step 300, data may be received. For instance, a plurality of data elements may be received by data relation and redundancy computing platform 110. In some examples, the data may be received from sources internal to the enterprise organization implementing the data relation and redundancy computing platform 110 (e.g., internal entity computing system 120, internal entity computing system 125, or the like) and/or from sources external to the enterprise organization (e.g., external entity computing system 170, external entity computing system 175, or the like).

At step 302, the data may be scored or a value of the data may be otherwise determined. For instance, machine learning may be used to determine a score or value of the data. In some examples, each data element may be scored or a value determined. For instance, data may be used as inputs into a machine learning model trained on historical data. The machine learning model may execute and determine a score for the data.

At step 304, a type of data may be determined for the received data. In some examples, each data element may be evaluated to determine a type of data associated with the data element. In some arrangements, machine learning may be used to determine the data type.

At step 306, one or more connections associated with the received data may be identified. For instance, the data may be used as input into a machine learning model. The machine learning model may execute and determine, based on the data, data type, and the like, one or more connections between the data and other types of data or other data. For instance, mortgage payment data may be received and a payment may be identified as a first type of data (e.g., payment amount). The machine learning model may then determine that a second type of data (e.g., an account associated with the payment) is connected or related to the payment amount data. Accordingly, a connection or relation between the first type of data and second type of data may be identified.

At step 308, the data element, score and/or identified connections may be stored. In some examples, the data may be stored in a data container associated with the identified data type. Accordingly, a user may search by data type, receive the stored data in response and understand connections to other data based on the stored connections.

At step 310, the stored data may be evaluated to determine whether one or more redundancies exists. For instance, the data may be evaluated to determine whether it is redundant, duplicative, or the like. In some examples, stored data may be compared to other stored data in the same data container (e.g., having a same data type) to determine whether one or more redundancies exists. Additionally or alternatively, the stored data may be compared to data in containers associated with other data types (e.g., connection or relation data types) to determine whether one or more redundancies exist. Accordingly, a more complete picture of where data is stored, whether data is duplicative, and the like may be captured.

In some arrangements, an identified data score may be used to determine whether one or more data redundancies exist and/or whether data is eligible for one or more data redundancy actions. For instance, a data score may be compared to one or more scoring thresholds to determine whether data is redundant, whether it is eligible for data redundancy actions, or the like.

If, at step 310, one or more redundancies do not exist or are not identified, the system may maintain storage of the data and associated connections, score, and the like at step 314.

If, at step 310, one or more redundancies are identified, one or more redundancy actions may be identified at step 316. For instance, redundancy rules may be used to evaluate the redundant data, duplicative data, or the like, to determine one or more types of actions to take. In some examples, business rules, regulatory rules, service level agreements, and the like, may be used to determine the redundancy actions. For example, one or more regulatory rules may indicate that data may not be deleted until a predetermined time period has elapsed (e.g., one year, five years, of the like). Accordingly, the data identified as including one or more redundancies may be evaluated using the rules to determine whether it meets criteria for deletion. In another example, data that is not considered eligible for deletion may be compressed (e.g., duplicative data items combined and compressed to reduce an amount of storage needed for the data). Accordingly, the system may efficiently control storage capacity by identifying and eliminating or reducing the impacts of redundant data in anticipation of subsequent data that may be received.

At step 318, the identified one or more data redundancy actions may be executed. For instance, data may be deleted, compressed, or the like, in response to identifying one or more data redundancy actions based rules stored or executed by, for instance, the data redundancy engine.

The arrangements described herein enable efficient evaluation of data to understand value of data and efficiently control storage of data, removal of data and the like. As data is received from various sources, channels and the like, a value or score may be determined. Further, a data type may be identified and connections between other data types or data may be identified. A data redundancy engine may be used to evaluate data for redundancies and identified one or more data redundancy actions for execution.

In one example arrangement, mortgage data may be received by an enterprise organization. The data may be received via various channels and may include location of the property, value of the property, payment history and the like. The received data may be scored and one or more relations between each data element may be identified. The data may then be stored according to data type, score, or the like.

In some examples, a data redundancy engine may be used to evaluate the stored data. For instance, if mortgage data is collected over a ten year period, the volume of data may be great for each property but some of the data might not change during that period. Accordingly, data that is duplicative, for example, may be deleted or compressed for more efficient storage and to free capacity for later received data. If compressed, a connection between the compressed data and one or more other types of data may be identified and stored.

Further, as additional data is received, it may be evaluated, connections identified, and the like. For instance, as mortgage payment data is received, the data may be scored and connections to other types of data (e.g., property address, property value, and the like) may be identified. The data from the payment may then be stored, evaluated for redundancy, and the like. Accordingly, data for a mortgage that may be stored in a first system may then be connected to mortgage payment data that may be stored in a second, different system.

The above example is just one example of the arrangements described herein. Additional examples may be used without departing from the invention.

Figure 4:
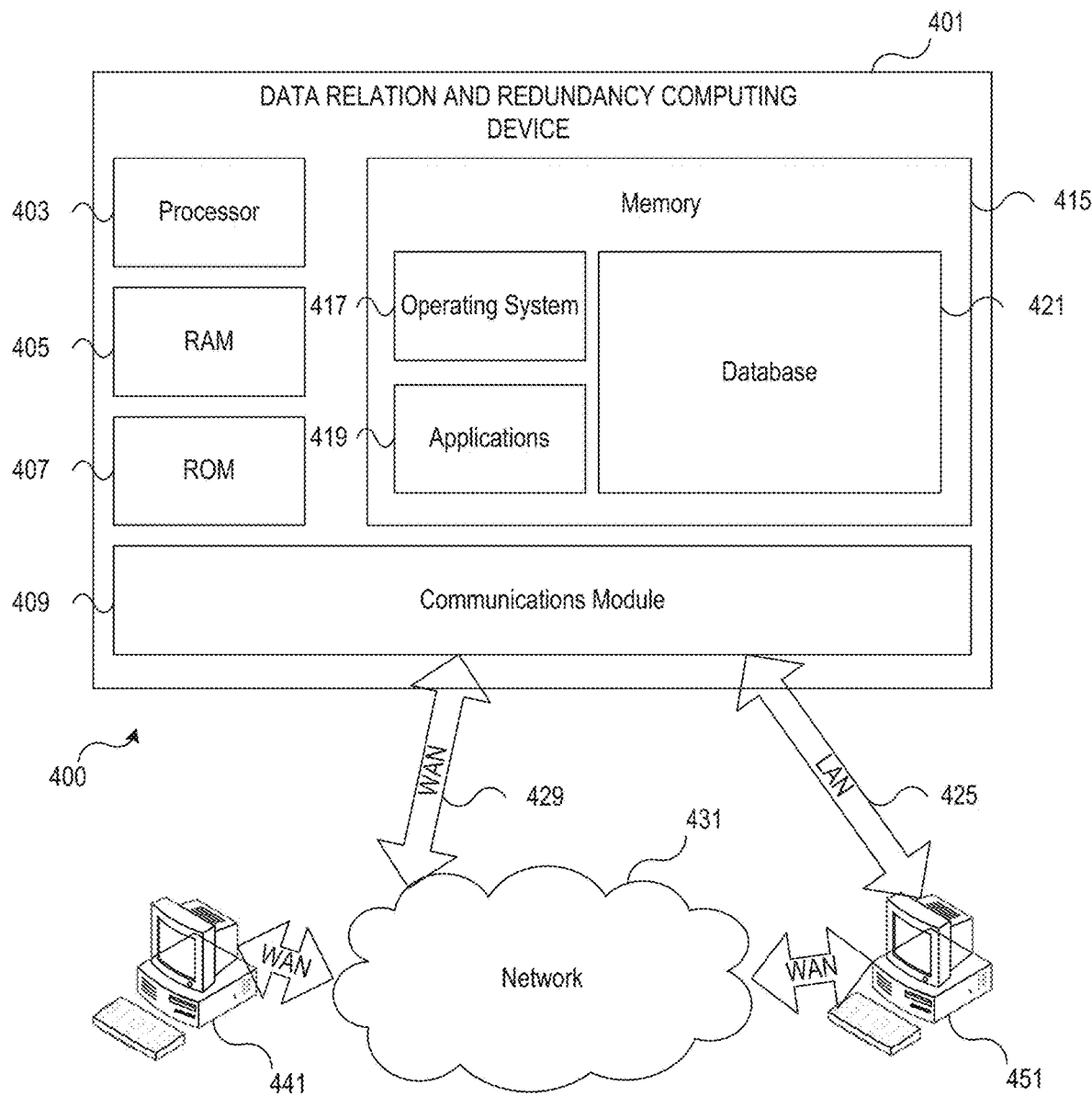
FIG. 4 illustrates one example environment in which various aspects of the disclosure may be implemented in accordance with one or more aspects described herein.

FIG. 4 depicts an illustrative operating environment in which various aspects of the present disclosure may be implemented in accordance with one or more example embodiments. Referring to FIG. 4, computing system environment 400 may be used according to one or more illustrative embodiments. Computing system environment 400 is only one example of a suitable computing environment and is not intended to suggest any limitation as to the scope of use or functionality contained in the disclosure. Computing system environment 400 should not be interpreted as having any dependency or requirement relating to any one or combination of components shown in illustrative computing system environment 400.

Computing system environment 400 may include data relation and redundancy computing device 401 having processor 403 for controlling overall operation of data relation and redundancy computing device 401 and its associated components, including Random Access Memory (RAM) 405, Read-Only Memory (ROM) 407, communications module 409, and memory 415. Data relation and redundancy computing device 401 may include a variety of computer readable media. Computer readable media may be any available media that may be accessed by data relation and redundancy computing device 401, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by data relation and redundancy computing device 401.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on data relation and redundancy computing device 401. Such a processor may execute computer-executable instructions stored on a computer-readable medium.

Software may be stored within memory 415 and/or storage to provide instructions to processor 403 for enabling data relation and redundancy computing device 401 to perform various functions as discussed herein. For example, memory 415 may store software used by data relation and redundancy computing device 401, such as operating system 417, application programs 419, and associated database 421. Also, some or all of the computer executable instructions for data relation and redundancy computing device 401 may be embodied in hardware or firmware. Although not shown, RAM 405 may include one or more applications representing the application data stored in RAM 405 while data relation and redundancy computing device 401 is on and corresponding software applications (e.g., software tasks) are running on data relation and redundancy computing device 401.

Communications module 409 may include a microphone, keypad, touch screen, and/or stylus through which a user of data relation and redundancy computing device 401 may provide input, and may also include one or more of a speaker for providing audio output and a video display device for providing textual, audiovisual and/or graphical output. Computing system environment 400 may also include optical scanners (not shown).

Data relation and redundancy computing device 401 may operate in a networked environment supporting connections to one or more remote computing devices, such as computing devices 441 and 451. Computing devices 441 and 451 may be personal computing devices or servers that include any or all of the elements described above relative to data relation and redundancy computing device 401.

The network connections depicted in FIG. 4 may include Local Area Network (LAN) 425 and Wide Area Network (WAN) 429, as well as other networks. When used in a LAN networking environment, data relation and redundancy computing device 401 may be connected to LAN 425 through a network interface or adapter in communications module 409. When used in a WAN networking environment, data relation and redundancy computing device 401 may include a modem in communications module 409 or other means for establishing communications over WAN 429, such as network 431 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one FIG. may be used in combination with one or more steps described with respect to another figure, and/or one or more depicted steps may be optional in accordance with aspects of the disclosure.

What is claimed is:

1. A computing platform, comprising:
   at least one processor;
   a communication interface communicatively coupled to the at least one processor; and
   a memory storing computer-readable instructions that, when executed by the at least one processor, cause the computing platform to:
      receive a plurality of data elements;
      for each data element of the plurality of data elements:
         score, using a machine learning model, a respective data element, wherein the scoring is based, at least in part, on a usage of the respective data element;
         identify a type of data associated with the respective data element;
         identify, using the machine learning model, connections between the type of data associated with the respective data element and other types of data;
         store the respective data element in a data container associated with the type of data, storing the respective data element including storing the score for the respective data element and the identified connections between the type of data associated with the respective data element and other types of data;
         evaluate, using a data redundancy engine and based, at least in part, on the score for the stored data element, the stored data element to determine whether the stored data element is redundant;
         responsive to determining that the stored data element is not redundant, maintain storage of the data element and connections;
         responsive to determining that the stored data element is redundant:
            identify one or more data redundancy actions for execution; and
            execute the identified one or more data redundancy actions.

2. The computing platform of claim 1, wherein the one or more data redundancy actions include one or more of: a data compression action and a data deletion action.

3. The computing platform of claim 1, wherein identifying the one or more data redundancy actions for execution includes applying one or more rules to the respective data element.

4. The computing platform of claim 3, wherein the one or more rules are based on regulatory requirements for data storage.

5. The computing platform of claim 1, wherein the machine learning model is trained using historical data.

6. The computing platform of claim 1, wherein the plurality of data elements is received from a plurality of sources.

7. The computing platform of claim 6, wherein the plurality of sources includes sources internal to an enterprise organization and sources external to the enterprise organization.

8. A method, comprising:
   receiving, by a computing platform, the computing platform having at least one processor and memory, a plurality of data elements;
   for each data element of the plurality of data elements:
      scoring, by the at least one processor and using a machine learning model, a respective data element, wherein the scoring is based, at least in part, on a usage of the respective data element;
      identifying, by the at least one processor, a type of data associated with the respective data element;
      identifying, by the at least one processor and using the machine learning model, connections between the type of data associated with the respective data element and other types of data;
      storing, by the at least one processor, the respective data element in a data container associated with the type of data, storing the respective data element including storing the score for the respective data element and the identified connections between the type of data associated with the respective data element and other types of data;
      evaluating, by the at least one processor using a data redundancy engine and based at least in part on the score for the stored data element, the stored data element to determine whether the stored data element is redundant;
      when it is determined that the stored data element is not redundant, maintaining storage of the data element and connections;
      when it is determined that the stored data element is redundant:
         identifying, by the at least one processor, one or more data redundancy actions for execution; and
         executing, by the at least one processor, the identified one or more data redundancy actions.

9. The method of claim 8, wherein the one or more data redundancy actions include one or more of: a data compression action and a data deletion action.

10. The method of claim 8, wherein identifying the one or more data redundancy actions for execution includes applying one or more rules to the respective data element.

11. The method of claim 10, wherein the one or more rules are based on regulatory requirements for respective data storage.

12. The method of claim 8, wherein the machine learning model is trained using historical data.

13. The method of claim 8, wherein the plurality of data elements is received from a plurality of sources.

14. The method of claim 13, wherein the plurality of sources includes sources internal to an enterprise organization and sources external to the enterprise organization.

15. One or more non-transitory computer-readable media storing instructions that, when executed by a computing platform comprising at least one processor, memory, and a communication interface, cause the computing platform to:
receive a plurality of data elements;
for each data element of the plurality of data elements:
score, using a machine learning model, a respective data element, wherein the scoring is based, at least in part, on a usage of the respective data element;
identify a type of data associated with the respective data element;
identify, using the machine learning model, connections between the type of data associated with the respective data element and other types of data;
store the respective data element in a data container associated with the type of data, storing the respective data element including storing the score for the respective data element and the identified connections between the type of data associated with the respective data element and other types of data;
evaluate, using a data redundancy engine and based, at least in part, on the score for the stored data element, the stored data element to determine whether the stored data element is redundant;
responsive to determining that the stored data element is not redundant, maintain storage of the data element and connections;
responsive to determining that the stored data element is redundant:
identify one or more data redundancy actions for execution; and
execute the identified one or more data redundancy actions.

16. The one or more non-transitory computer-readable media of claim 15, wherein the one or more data redundancy actions include one or more of: a data compression action and a data deletion action.

17. The one or more non-transitory computer-readable media of claim 15, wherein identifying the one or more data redundancy actions for execution includes applying one or more rules to the respective data element.

18. The one or more non-transitory computer-readable media of claim 17, wherein the one or more rules are based on regulatory requirements for data storage.

19. The one or more non-transitory computer-readable media of claim 15, wherein the machine learning model is trained using historical data.

20. The one or more non-transitory computer-readable media of claim 15, wherein the plurality of data elements is received from a plurality of sources.

21. The one or more non-transitory computer-readable media of claim 20, wherein the plurality of sources includes sources internal to an enterprise organization and sources external to the enterprise organization.

\* \* \* \* \*